United States Patent [19]

Lewis et al.

[11] 4,087,158

[45] May 2, 1978

[54] LOW-LOSS SINGLE FILAMENT FIBER OPTIC CONNECTOR WITH THREE CONCENTRIC TAPERED MEMBERS FOR EACH FILAMENTS

[75] Inventors: Adolph L. Lewis, La Mesa; Daniel E. Altman; Harold R. Fear, both of San Diego, all of Calif.

[73] Assignee: The United States of America as represented by the Secretary of the Navy, Washington, D.C.

[21] Appl. No.: 747,590

[22] Filed: Dec. 6, 1976

[51] Int. Cl.² .............................................. G02B 5/16
[52] U.S. Cl. .................................................. 350/96.21
[58] Field of Search ...................................... 350/96 C

[56] References Cited

U.S. PATENT DOCUMENTS

| | | | |
|---|---|---|---|
| 3,734,594 | 5/1973 | Trambarulo | 350/96 C |
| 3,914,880 | 10/1975 | Darss et al. | 350/96 C |
| 3,982,815 | 9/1976 | Nakayama | 350/96 C |
| 3,995,935 | 12/1976 | McCartney | 350/96 C |
| 4,030,810 | 6/1977 | Khoe | 350/96 C |

*Primary Examiner*—Jon W. Henry
*Attorney, Agent, or Firm*—R. S. Sciascia; G. J. Rubens; J. W. McLaren

[57] ABSTRACT

Single filament fiber optic cables are aligned within a connector to provide low-loss light transmittance from one to the other. Since it is virtually impossible to drill holes in a connector as small as the five thousandths of an inch typical diameter of a single filament fiber optic cable, the fiber optic cable ends are bonded within a section of micro-tubing, of the stainless steel type used for the micro syringe portion of a hyperdermic needle. The single filament fiber optic cable ends thus bonded within the micro-tubing, are received within terminal members of a selected metal material having internal bores which are readily drilled by conventional means to receive the micro-tubing having the ends of the fiber optic cables bonded therein. This assembly is made by force fit and each such assembled terminal of the single filament fiber optic cable is optically ground and polished at its end. Two such fiber optic cable end terminals, which preferably have a slight taper, are received into a central cylindrical member which has a configuring taper and aligns the two single filament fiber optic cable ends to facilitate the transmittance of optical energy with minimal light loss. A suitable end cap at each end of the central member retains the two terminal members in desired abutting alignment. Preferably, the central cylindrical member is fabricated of a metal dissimilar to the metal of the terminal members which it receives in its internal bore.

3 Claims, 2 Drawing Figures

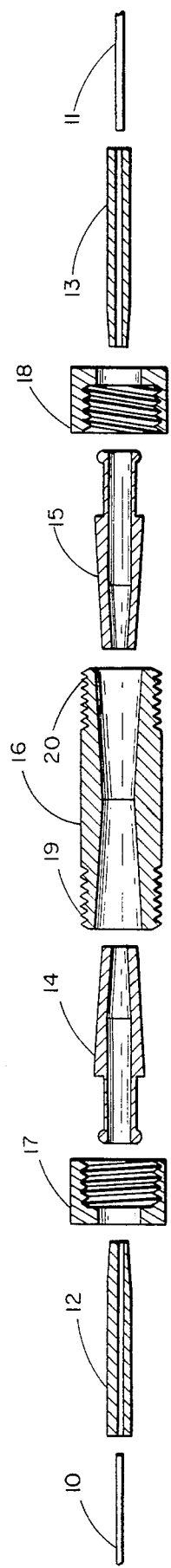
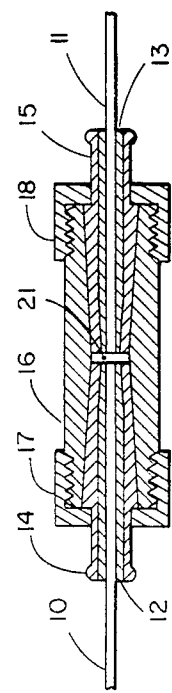
Fig. 1
Fig. 2

LOW-LOSS SINGLE FILAMENT FIBER OPTIC CONNECTOR WITH THREE CONCENTRIC TAPERED MEMBERS FOR EACH FILAMENTS

BACKGROUND OF THE INVENTION

In optical systems for transmitting signal intelligence by light energy, it is most important in employing single filament fiber optic cable that the ends of such fiber optic cable be joined in precise alignment to assure minimum light losses in the transmittance of light energy from one cable end to another.

State of the art single filament fiber optic cable may typically have an outside diameter of five thousandths of an inch, including the cladding, and a core diameter of the fiber of three thousandths of an inch. In order to avoid undue, undesirable, excessive light losses in a connector which joins two such cable ends, the alignment limits should be of the order of plus or minus two microns. Additionally, of course, as logically follows, the gap between the ends of the fibers must be extremely small for good transmittance between the fiber optic cable ends. By far, however, the major difficulty and problem is posed by the requirement of alignment of two such very small diameter fiber optic cable ends within the extremely stringent limits of plus or minus two microns.

In the prior art, because it was not possible to conveniently and readily drill holes in a metal terminal end material having the extremely small internal diameter of the order of five thousandths of an inch, other alternative approaches have been contrived. One of these approaches required that the four corners on four small pieces of a suitable metal, such as brass, be angularly milled at 45° to remove approximately three thousandths of an inch of the corner material. The four brass pieces were then assembled in a square, with each of the milled corners on the inside, forming a rectangular or square elongate cavity to receive and contain the end of the fiber optic cable. The four pieces of material so assembled were then soldered or bonded in an appropriate manner at their interfaces. However, it was found almost impossible to bond or solder the interfaces between the four elements without some solder or bonding material creeping into the cavity.

A second alternative method was devised which eliminated two of the interfaces. This latter method required that a high precision, extremely small groove be milled in each of two matching pieces of suitable material such as brass, for instance. When joined, the two pieces formed a square elongate cavity for receiving and supporting a single filament fiber optic cable end. The two pieces were affixed to each other by bonding or soldering, for example; but joining the two pieces to form a unitary terminal element for a single filament fiber optic cable was found to be difficult because of the creep of solder or bonding material into the square elongate cavity.

A further expedient was attempted by filling the square elongate cavity with a material that solder would not wet, nor adhere to bonding material. After the terminal member had been soldered or bonded into a unitary assembly, the filling material within the cavity was removed. However, considerable difficulty was experienced in efficiently removing the fill material from the elongate square cavity and, moreover, in many cases it was found to be difficult to insert the end of a single filament fiber optic cable into the cavity.

Accordingly, the need exists for a new type of connector which will align extremely small diameter single filament fiber optic cables to assure minimal light losses at the point of such connection, since drilling holes in a metallic or similar type of material having an internal diameter of the order of five thousandths of an inch is not readily accomplished; furthermore even when such holes are successfully drilled in a suitable terminal material, the desired alignment cannot be assured because of the tendency of such extremely small drills to bend and flex during the drilling operation.

Therefore, it is highly desirable that a new and improved single filament fiber optic cable connector be provided which can be fabricated by comparatively conventional methods and function to transmit light from one such single filament fiber optic cable end to another with minimal light loss as is assured by end-to-end alignment along a single axis within plus or minus two microns.

SUMMARY OF THE INVENTION

The present invention contemplates adapting conventional machining procedures to the fabrication of a connector for maintaining two single filament fiber optic cable ends in precise alignment. It is most difficult, if not vitually impossible, to successfully drill holes in a suitable material, such as a selected metal, having an inside diameter of the order of five thousandths of an inch to receive a typical single filament fiber optic cable. However, it is readily possible to drill holes in the same selected metallic material of the order of twenty-five to thirty thousandths of an inch diameter.

In accordance with the concept of the present invention, the end of a single filament fiber optic cable, having an outside diameter including cladding of approximately five thousandths of an inch, may be adapted to be received into a metallic terminal member with the assurance of a precisely aligned single filament fiber optic cable end.

The concept of the present invention provides that a section of micro-tubing, of the type which is commercially available and customarily used for the micro syringe portion of a hyperdermic needle, is employed for bonding the ends of first and second single filament fiber optic cables therein. Such micro-tubing conventionally has an outside diameter of the order of twenty-five to thirty thousandths of an inch and after the single filament fiber optic cable has been bonded within the micro-tubing, the end is optically ground and polished to provide a substantially optically flat surface. The assembly of the micro-tubing, with the single filament fiber optic cable bonded therein, is then inserted by force fit into an internal bore (of the order of twenty-five to thirty thousandths of an inch diameter) of a terminal member of a selected metal material. The polished end of the single filament fiber optic cable is aligned flush with the end of the terminal member.

A central cylindrical member, which is preferably fabricated of a metal dissimilar to the metal of first and second terminal members within which the ends of first and second single filament fiber optic cables are bonded, has an inside diameter dimensioned to receive the first and second terminal members in abutting disposition. In a preferred embodiment of the present invention, such central cylindrical member preferably has a slightly tapered internal bore to receive the first and second internal members having a matching external taper which facilitates removal of the two single filament fiber optic cable end assemblies when disconnection is desired.

The assembly of the connector of the present invention is completed by removable means such as threaded end caps which connect and attach to the central cylindrical member at threaded ends for retaining the first and second terminal members in the desired abutting disposition within the central cylindrical member.

Those skilled and knowledgeable in the pertinent arts of fabrication and machining practices will appreciate that cylindrical internal bores of the order of twenty-five thousandths of an inch diameter, including the described desired tapered configuration, may be readily achieved by conventional drilling and reaming procedures to assure precise alignment of the single filament fiber optic cable ends in accordance with the concept and teaching of the present invention.

When the single filament fiber optic cable ends have been bonded within the micro-tubing in accordance with the teaching of the present invention, the succeeding fabrication and assembly steps as conceived by the present invention are readily achievable through conventional and well known procedures. Thus, in accordance with the concept of the present invention, the initial step of bonding first and second single filament fiber optic cable ends within respective sections of the micro-tubing having an inside diameter to conveniently accommodate the extremely small cross-sectional area of such single filament fiber optic cable ends, and an outside diameter which readily accommodates to a cavity drilled by conventional means, overcomes the problems of prior art concepts and expedients.

Accordingly, it is an object of the present invention to provide a low loss connector for joining single filament fiber optic cable ends.

A most important object of the present invention is to provide such a connector which is especially adapted to the extremely small cross-section size of such single filament fiber optic cable ends and may be fabricated by conventional techniques.

A further most important object of the present invention is to provide a connector for joining single filament fiber optic cable ends in an optically aligned light transmission path which minimizes light loss by assuring such optical alignment within several microns.

A further object of the present invention is to provide such a connector for single filament fiber optic cable ends which is readily assembled and disassembled as desired.

These and other features, objects, and advantages of the present invention will be better appreciated from an understanding of the operative principles of a preferred embodiment as described hereinafter and as illustrated in the accompanying drawings.

BRIEF DESCRIPTION OF THE DRAWINGS

In the drawings:

FIG. 1 is an exploded view of an embodiment of the present invention illustrating its component parts; and FIG. 2 is a drawing illustrating the assembled single filament fiber optic cable connector of FIG. 1.

DESCRIPTION OF THE PREFERRED EMBODIMENT

In the drawings illustrating a typical preferred embodiment of the present invention it should be borne in mind that, of necessity for purposes of clarity and ease of understanding, all dimensions are greatly enlarged and, additionally, scalar proportions may vary from that of actual embodiments. For example, the typical embodiment of the present invention in its assembled state may typically have an overall maximum length of less than one inch.

In the illustration of FIG. 1, single filament fiber optic cables are shown at 10 and 11. Typically such cables may have an outside diameter of approximately five thousandths of an inch including the cladding, with an internal core of the principal light transmitting material having a diameter of three thousandths of an inch.

First and second sections of micro-tubing of the type such as is customarily used in hyperdermic syringe needles are shown at 12 and 13. First and second terminal members 14 and 15 have internal bores which are dimensioned to receive the first and second sections of micro-tubing 12 and 13, respectively.

A central cylindrical member 16 is preferably fabricated of a metal dissimilar to that of terminal members 14 and 15 to facilitate ease of disassembly of the members 14, 15 and 16. End caps 17 and 18 are internally threaded to be removably secured to the threaded end portions 19 and 20 of the central cylindrical member 16 for retaining the first and second terminal members 14 and 15 in an aligned abutting disposition within the central cylindrical member 16.

The exploded elements illustrated in FIG. 1 are shown in assembly in FIG. 2. In the fabrication and assembly of the low-loss connector for single filament fiber optic cable ends of the present invention, the fiber optic cable ends 10 and 11 are bonded within the first and second sections of micro-tubing 12 and 13 by appropriate bonding material.

The ends of the bonded assembly are then preferably ground and polished to have substantially optically flat ends. First and second terminal members 14 and 15 have internal bores which are readily drilled through the use of conventional machining practices to accommodate the outside dimensions of the micro-tubing sections 12 and 13, including the single filament fiber optic cable ends 10 and 11 bonded therein, respectively.

The bonded assembly of micro-tubing sections and fiber optic cable are force fitted into the internal bore of the respective first and second terminal members 14 and 15 and the terminal members 14 and 15 are, in turn, inserted into the internal bore of the central cylindrical member 16 in an axially aligned near-abutting disposition as shown in FIG. 2.

The end caps 17 and 18 are then screwed onto the threaded end portions 19 and 20 of the central cylindrical member 16 to secure the assembly as shown in FIG. 2. In a preferred embodiment of the present invention, a small amount of suitable liquid material 21 having a refractive index substantially the same as that of the fiber optic cable is contained within the aligned near-abutting ends of the assembly to complete a more efficient optical path through the connector.

Accordingly, it will be appreciated by those skilled and knowledgeable in the pertinent arts that the present invention, through the use of sleeve-like sections of micro-tubing overcomes problems of the prior art and makes it possible to fabricate a low loss connector for single filament fiber optic cables by conventional, relatively inexpensive, and uncomplicated methods and procedures.

Moreover, the concept of the present invention provides a significantly simplified method of fabrication as compared to other expedients which attempted to solve the same problem, eliminating several steps of manufacture typical of prior art practices which were cumbersome and diffiult to accomplish within the stringent requirements of low loss connectors for single filament fiber optic cable ends.

Further the concept of the present invention is such that the connector may be readily disassembled without damage to the relatively fragile, extremely small diameter, single filament fiber optic cables.

Obviously many modifications and variations of the present invention are possible in the light of the above teachings. It is therefore to be understood that within the scope of the appended claims the invention may be practiced otherwise than as specifically described.

What is claimed is:

1. A connector for removably joining first and second single-filament fiber optic cables in an optically aligned light transmission path comprising:

first and second sections of stainless steel micro-tubing having an inside diameter of the order of five thousandths of an inch for bonding the ends of said first and second fiber optic cables therein, an outside diameter of the order of five times the inside diameter, and slightly tapered end portions;

first and second terminal members of a first metal having internal bores therethrough dimensioned and tapered to receive said first and second sections of stainless steel micro-tubing with said ends of fiber optic cables bonded therein and having concentrically tapered outer surfaces;

a central cylindrical member fabricated of a metal dissimilar to said first metal and having an inside diameter dimensioned and concentrically tapered to receive said first and second terminal members in near-abutting axially aligned disposition; and removable means supported on said central cylindrical member for retaining said first and second terminal members in said near-abutting axially aligned disposition within said central cylindrical member.

2. A connector for removably joining first and second single-filament fiber optic cables as claimed in claim 1 wherein said removable means comprises internally threaded screw caps.

3. A connector for removably joining first and second single-filament fiber optic cables as claimed in claim 1 and including a light transmissive fluid retained between the near-abutting ends of said terminal members, said fluid having an index of refraction substantially matching that of said fiber optic cables.

* * * * *